(12) United States Patent
Philpott

(10) Patent No.: US 8,181,752 B2
(45) Date of Patent: May 22, 2012

(54) BRAKE OVERSTROKE INDICATION SYSTEM

(75) Inventor: Daniel J. Philpott, Rochester, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1124 days.

(21) Appl. No.: 10/644,354

(22) Filed: Aug. 20, 2003

(65) Prior Publication Data

US 2005/0039988 A1    Feb. 24, 2005

(51) Int. Cl.
    *F16D 55/08*    (2006.01)
(52) U.S. Cl. ...................................... 188/72.9
(58) Field of Classification Search .............. 188/72.9, 188/1.11 R, 1.11 W, 1.11 L, 1.11 E
    See application file for complete search history.

(56) References Cited

U.S. PATENT DOCUMENTS

| | | | | |
|---|---|---|---|---|
| 2,026 A | * | 4/1841 | White et al. | 100/279 |
| 4,879,964 A | * | 11/1989 | Emerson, Jr. | 116/28 R |
| 5,699,880 A | * | 12/1997 | Hockley | 188/1.11 W |
| 5,825,287 A | | 10/1998 | Zarybaicky, Sr. et al. | |
| 5,848,673 A | * | 12/1998 | Strauss et al. | 188/1.11 L |
| 6,255,941 B1 | | 7/2001 | Osterman et al. | |
| 6,273,218 B1 | * | 8/2001 | Kramer | 188/1.11 R |
| 6,352,137 B1 | | 3/2002 | Stegall et al. | |
| 6,390,244 B1 | * | 5/2002 | Sitter | 188/1.11 W |
| 2002/0167402 A1 | * | 11/2002 | Trenado et al. | 340/454 |

\* cited by examiner

*Primary Examiner* — Melanie Torres Williams
(74) *Attorney, Agent, or Firm* — Carlson, Gaskey & Olds, PC

(57) ABSTRACT

A vehicle brake assembly provides an indicator system in which the operating shaft assembly rotates about a pivot axis to rotate a cam member attached thereto against a cam surface which extends from an indicator adjustment shaft. The cam member drives the cam surface and attached indicator adjustment shaft to overcome a biasing member, actuate an overstroke sensor, and simultaneously retract an indicator post to provide a visual indication. Another indicator system includes an overstroke sensor located within the brake housing in an angular position relative the pivot axis adjacent a path of the operating shaft assembly. Another indicator system includes a mechanical overstroke member that buckles in response to contact with the operating shaft to provide overstroke identification from outside the brake housing.

20 Claims, 5 Drawing Sheets

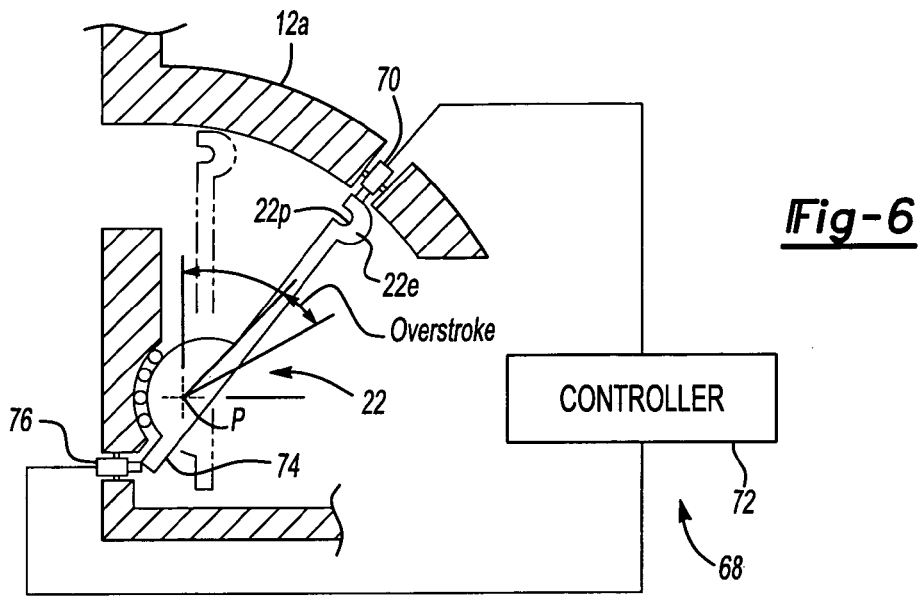
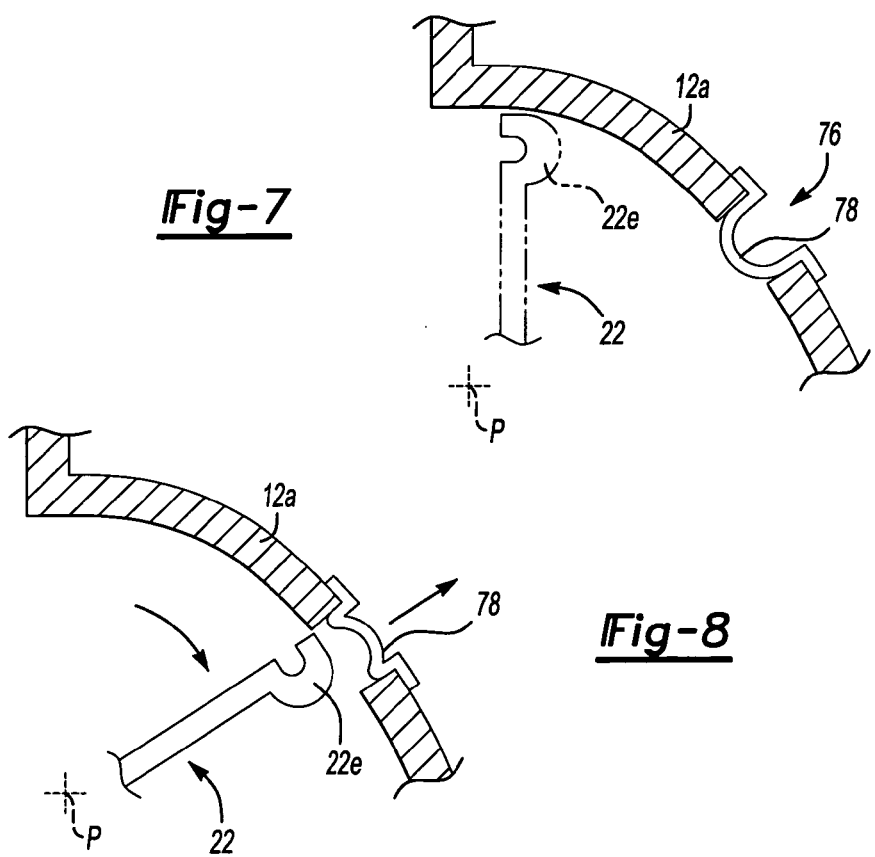

BRAKE OVERSTROKE INDICATION SYSTEM

BACKGROUND OF THE INVENTION

The present invention relates to a disc brake assembly, and more particularly to an indicator system for disc brake air chamber overstroke.

Heavy-duty vehicles are typically equipped with a pneumatic brake actuating system. The brake actuating system applies air under pressure to a service chamber of a brake actuator. This moves a diaphragm and a push rod connected to a linkage which actuates the vehicle brakes. An emergency chamber having a power spring and a second diaphragm is often mounted on the service chamber. The emergency chamber drives the push rod and actuates the brakes to provide failsafe braking.

A brake actuator push rod has a predetermined amount of available movement or stroke. The amount of movement required to fully actuate the braking system of the vehicle is monitored to assure that it remains within the available stroke of the push rod. Excessive stroke of the push rod can result due to factors such as brake lining wear and loosening of mechanical linkages between the push rod and brake linkages. These factors may sometimes cause excessive push rod stroke, which is typically referred to as "overstroke."

Various mechanical monitoring systems have been utilized to monitor push rod stroke during actuation of the brake and provide some indication to an operator when there is an overstroke occurrence. One known mechanical system includes a brightly colored ring painted on the push rod which indicates an overstroke condition when the ring extends out of the brake actuator during actuation of the brakes. The ring may, however, become difficult to see due to the location of the brake actuators and accumulated road debris. The common usage of automatic slack adjusters which incrementally adjust to compensate for slack in the braking system and to decrease the required push rod movement may further complicate such a system.

Various electronic monitoring systems utilizing sensors are also conventionally utilized. Disadvantageously, linkages utilized to actuate the sensor are often complicated and may be relatively fragile. The hostile environment in which the brake actuators are mounted may also damage the electronic systems, particularly where there are exposed components.

Accordingly, it is desirable to provide a brake overstroke indication system which is reliable, inexpensive and readily incorporated into a brake system having an automatic slack adjustment system.

SUMMARY OF THE INVENTION

The vehicle brake assembly according to the present invention provides an indicator system which includes an indicator adjustment shaft biased toward a housing portion such that an indicator post extends through an aperture in the housing portion. An overstroke sensor engages with an adjuster limit arm extending from the indicator adjustment shaft.

When the push rod extends past an overstroke condition, an operating shaft assembly rotates about the pivot axis to rotate a cam member attached thereto against a cam surface which extends from the indicator adjustment shaft. The cam member drives the cam surface member and the indicator adjustment shaft to overcome a biasing member such that the adjuster limit arm moves away from the overstroke sensor. The overstroke sensor sends a signal to a controller which provides an overstroke indication to a vehicle operator. Simultaneously, an indicator post retracts into the housing portion such that a mechanic is able to visually identify the overstroke condition in a maintenance environment.

Another indicator system includes an overstroke sensor located within the brake housing in an angular position relative to the pivot axis and adjacent a path of the operating shaft assembly. The overstroke sensor is located such that an end segment of the operating shaft assembly which includes a push rod receipt pocket contacts the overstroke sensor when the operating shaft assembly has been rotated to an overstroke condition. Alternatively or additionally, a lever assembly tab extends from the lever assembly opposite the end segment to likewise contact an overstroke sensor.

Another indicator system includes a mechanical overstroke member that buckles in response to contact with an end segment of the operating shaft assembly. The buckled overstroke member is therefore readily identifiable from outside the brake housing such that an operator or mechanic is readily able to visually identify that an overstroke condition has occurred.

The present invention therefore provides a brake overstroke indication system which is reliable, inexpensive and readily incorporated into a brake system having an automatic slack adjustment system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6 is another overstroke indicator system according to the present invention;

FIG. 7 is another overstroke indicator system in a first position; and

FIG. 8 is another overstroke indicator system of FIG. 7 in a second position;

DETAILED DESCRIPTION OF THE PREFERRED EMBODIMENT

Figure 1:
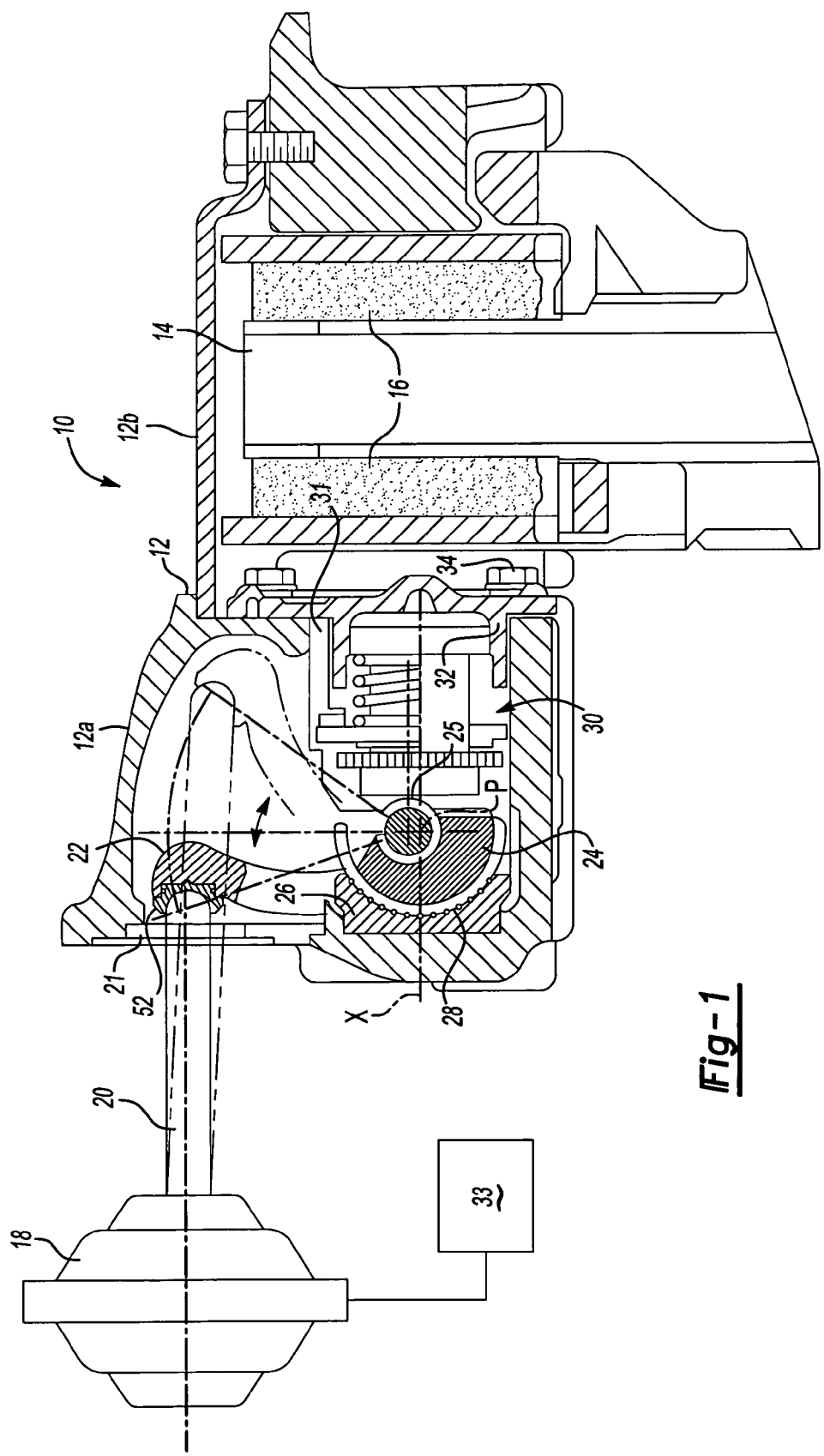
FIG. 1 is a cross-sectional end view of a vehicle brake assembly of the present invention.

FIG. 1 illustrates a partial cross-sectional view of a vehicle brake assembly 10. The vehicle brake assembly 10 includes a housing 12 that may be constructed from one or more housing portions 12a, 12b. A rotor 14 is arranged near or within the housing portion 12b of the housing 12 and has brake pads 16, or friction elements, arranged on either side of the outer surfaces of the rotor 14.

An actuator 18, typically an air chamber, actuates a brake mechanism 30 to force the brake pads 16 into engagement with the rotor 14. The actuator 18 drives a push rod 20 through a push rod opening 21 to rotate an operating shaft assembly 22 about a pivot axis P. The operating shaft assembly 22 includes a cam 24 having a profile 25 that cooperates with the brake mechanism 30 to drive the brake pads 16. The cam 24 is preferably received at least partially within a bearing block 26 supporting a plurality of needle bearings 28. It should be understood that various actuating systems which are operated by a lever can be utilized with the invention.

The opening 31 of the housing which receives the brake mechanism 30 is closed off on the front side, that is, in the position facing the brake disk, by a closing plate 32 which preferably at least partially supports the brake mechanism 30. The closing plate 32 is attached to the housing portion 12*a* by fasteners 34 or the like. Sealing elements are preferably located upon the sealing surfaces between the closing plate 32 and the housing 12.

In operation, upon actuation of the brake pedal by the vehicle operator, a pneumatic output is typically produced by a control module 33 to energize the actuator 18. Heavy-duty vehicle brake assemblies typically include a pair of pistons 36 (FIG. 2) that transmit the force generated by the actuator 18 through the push rod 20 and operating shaft assembly 22 to the brake pads 16. It is to be understood that any suitable number of pistons 36 may be used.

After the brakes are actuated, the brake pads 16 must be retracted to prevent the brake pads 16 from dragging on the rotor 14. To this end, a return assembly 38 operates to retract the pistons 36. The return assembly 38 generally includes a plate 40 adjacent a return spring 44. The return spring 44 is arranged between a portion of the housing 12*a* and the plate 40. The return spring 44 applies a force opposite the actuation force to the plate 40 and into the pistons 36 to retract the brake pads 16.

Figure 2:
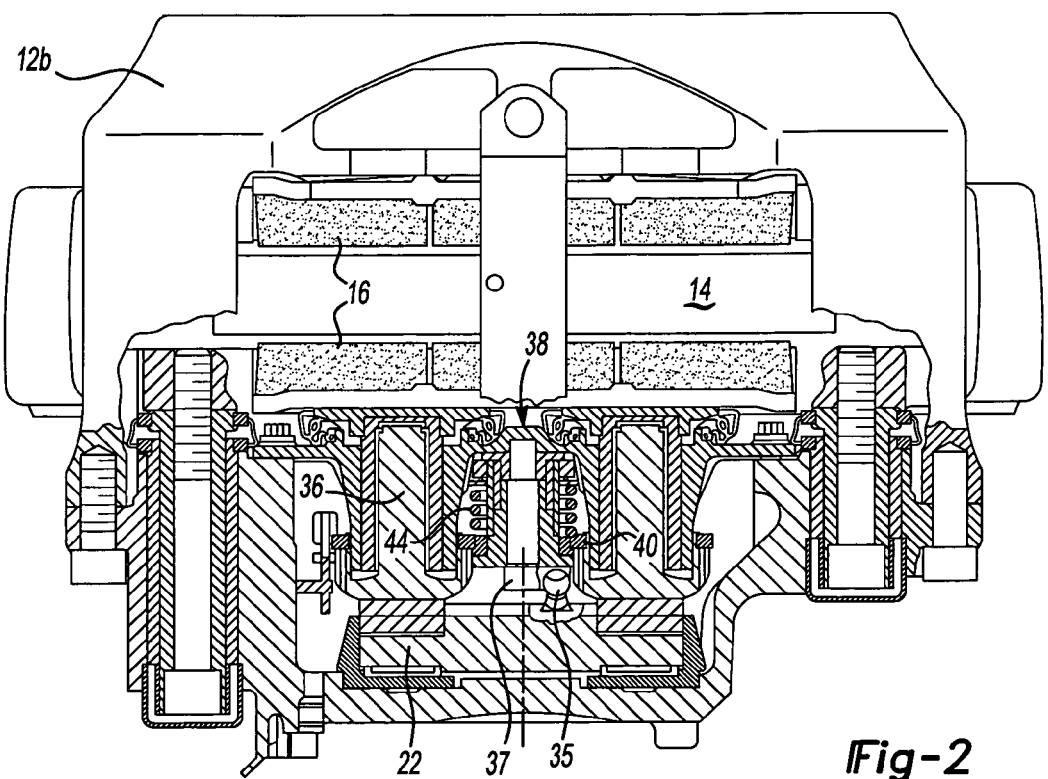
FIG. 2 is a cross-sectional bottom view of a vehicle brake assembly.
Figure 3:
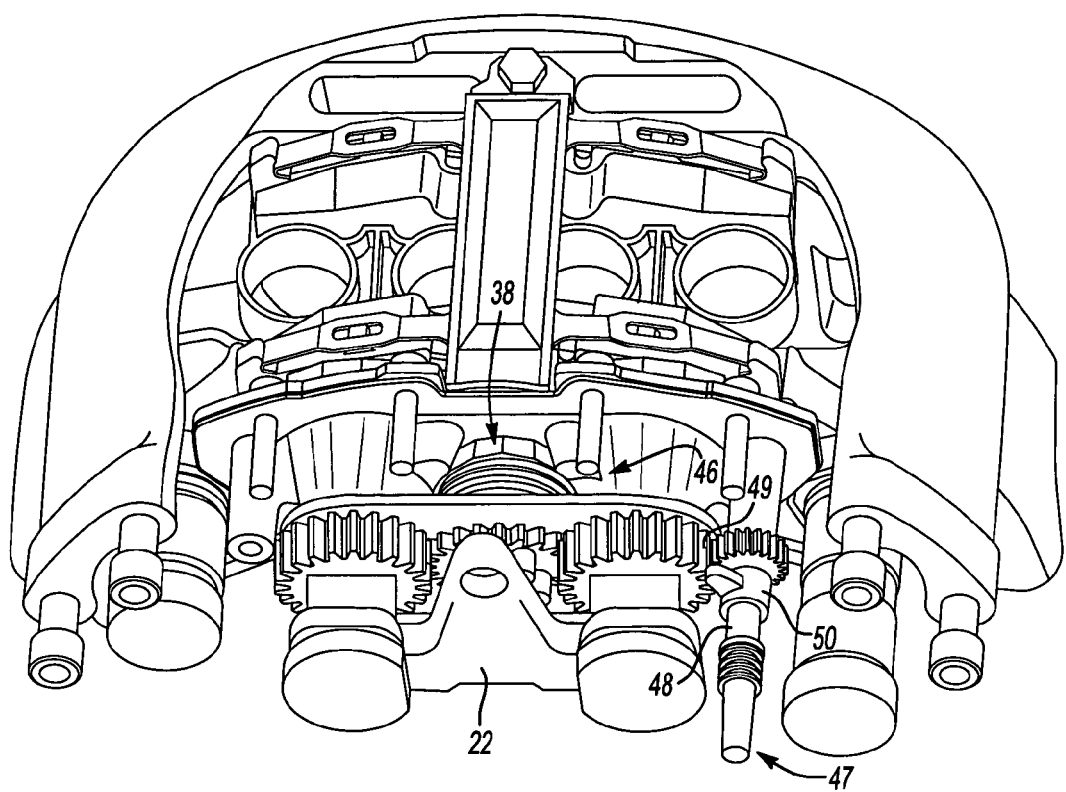
FIG. 3 is a top partial perspective view of a vehicle brake assembly illustrating a slack adjustment system with an overstroke indicator according to the present invention.

Referring to FIG. 3, a slack adjustment system 46 compensates for movement of the pistons 36 due to wear of the brake pads 16 through interaction between a ball-ended drive pin 35 mounted to the operating shaft assembly 22 and an adjuster shaft 37 as generally understood (FIG. 2).

An overstroke indicator system 47 includes an indicator adjustment shaft 48 which mounts an indicator adjuster limit arm 50 which moves with the slack adjustment system 46 along threads T (FIG. 4) and in response to a gear system 49 (See FIG. 3) to maintain a relative position. That is, the indicator adjuster arm 50 moves along the indicator adjustment shaft 48 as the brake pads 16 wear and the slack adjustment system 46 compensates therefore (FIG. 4).

Figure 4:
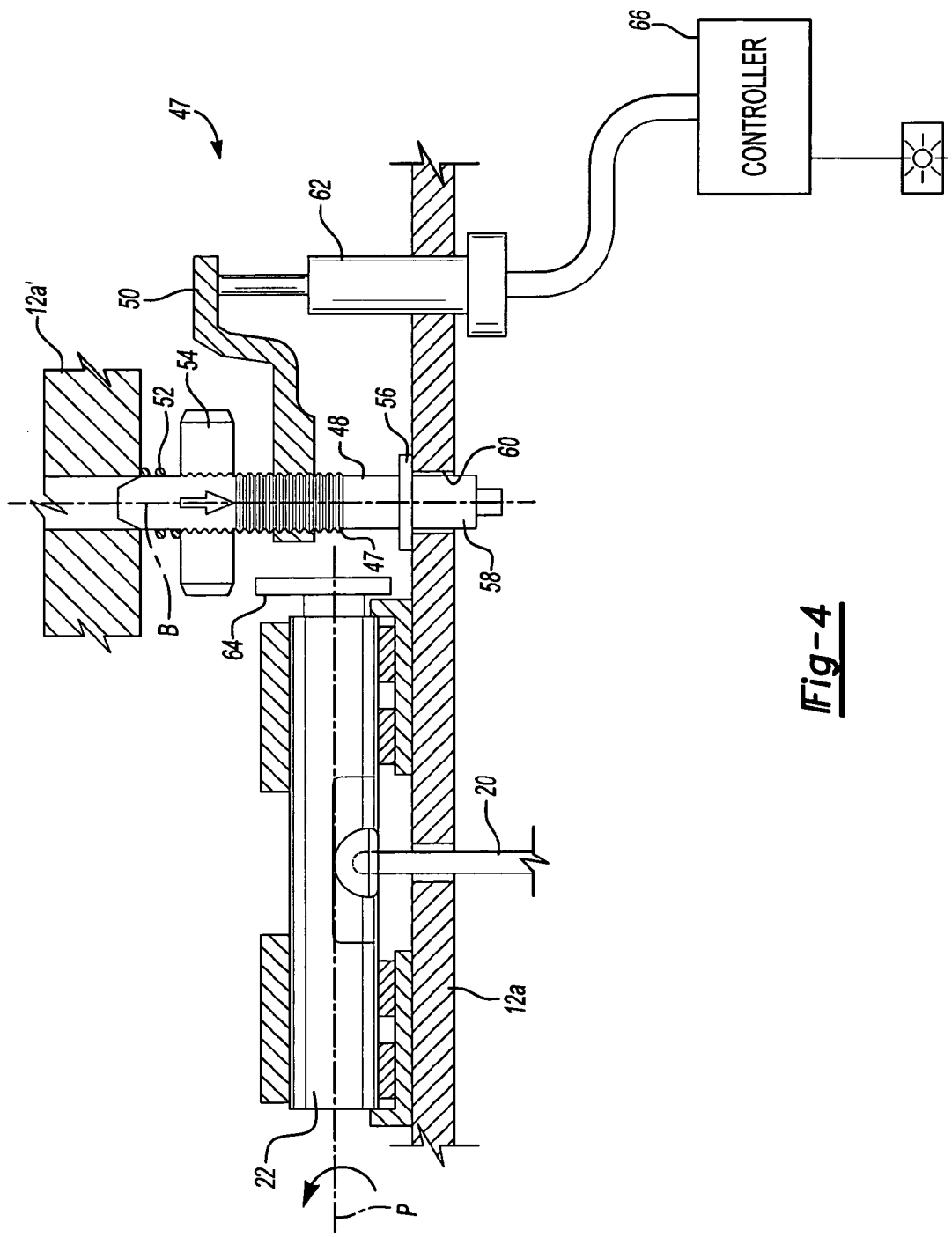
FIG. 4 is a top partial sectional view of an overstroke indicator system in a first position.

Referring to FIG. 4, the indicator adjustment shaft 48 is biased toward the housing portion 12*a* with a biasing member 52 such as a spring or the like. The biasing member 52 is captured between a housing portion 12*a'* and a cam surface member 54 mounted to the indicator adjustment shaft 48 to bias the spring away from housing portion 12*a'* (illustrated schematically by arrow B). The cam surface member 54 is preferably axially fixed to the adjustment shaft 48 and may be a gear which engages gear system 49.

A stop 56 maintains the axial position of the indicator adjustment shaft 48 against the biasing force of biasing member 52 such that an indicator post 58 extends through an aperture 60 in the housing portion 12*a*. The indicator post 58 is preferably colored to assist in visual identification.

Figure 5:
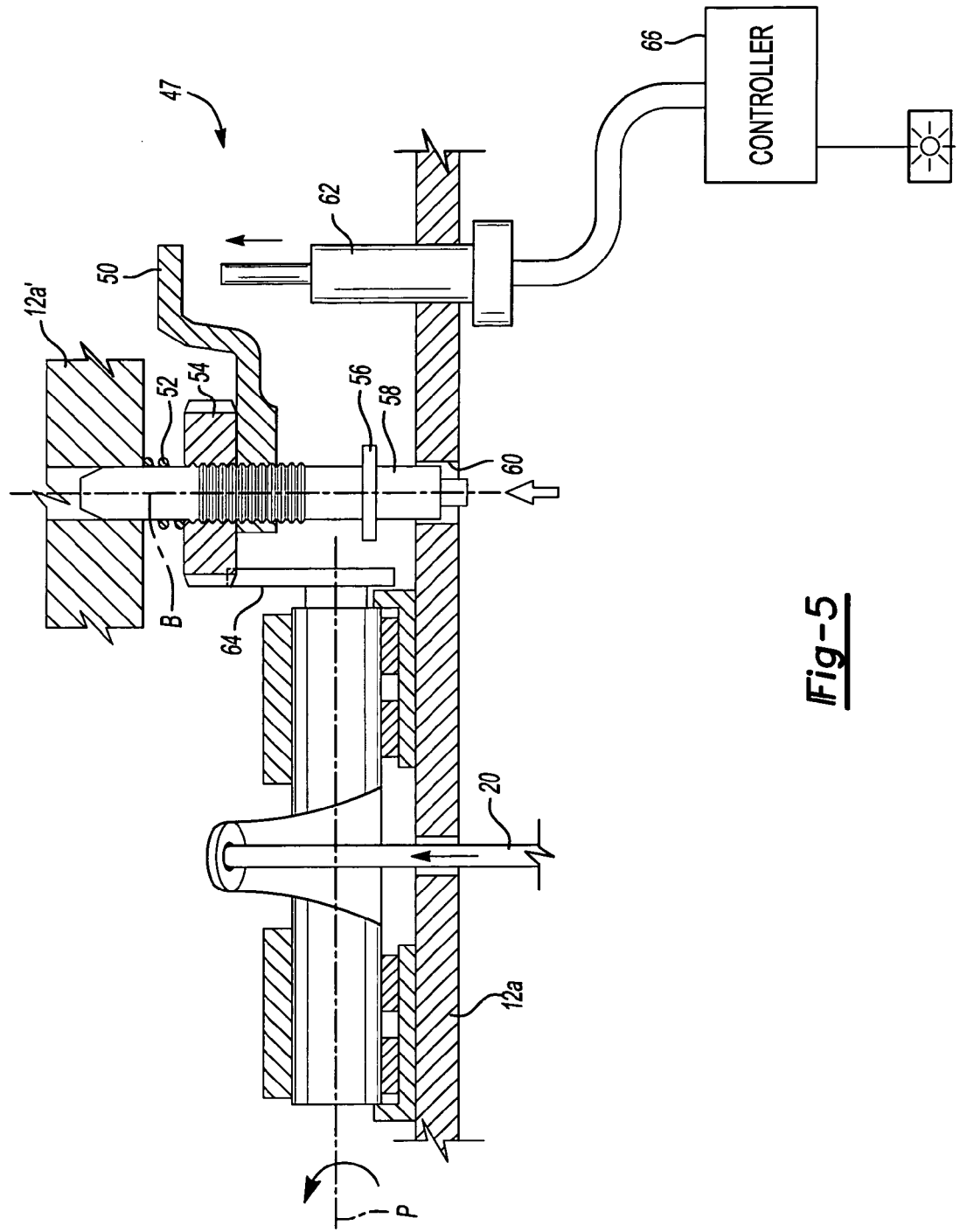
FIG. 5 is a top partial sectional view of the overstroke indicator system of FIG. 4 in a second position.

A overstroke sensor 62 such as a microswitch, reed switch or the like is mounted within the housing portion 12*a* to engage with the adjuster limit arm 50. When the push rod 20 (FIG. 1) extends past an overstroke condition, the operating shaft assembly 22 rotates about the pivot axis P to rotate a cam member 64 attached thereto against the cam surface member 54 (FIG. 5). The cam member 64 drives the cam surface member 54 and attached indicator adjustment shaft 48 to overcome the biasing member 52 such that the adjuster limit arm 50 moves away from the overstroke sensor 62. In response to the adjuster limit arm 50 moving away from the overstroke sensor 62, a signal is sent to a controller (illustrated schematically at 66) which provides an overstroke indication to a vehicle operator. Simultaneously, the indicator post 58 retracts through the aperture 60 through the housing portion 12*a* such that a mechanic is able to visually identify the overstroke condition in a maintenance environment. It should be understood that either or both the mechanical and electrical indicator will benefit each brake assembly 10.

Referring to FIG. 6, another indicator system 68 includes an overstroke sensor 70 located within the brake housing 12*a* located in an angular position relative pivot axis P adjacent a path of the operating shaft assembly 22. The overstroke sensor 70 is preferably located such that an end segment 22*e* of the operating shaft assembly 22 which includes a push rod receipt pocket 22*p* contacts the overstroke sensor 70 when the operating shaft assembly 22 has been rotated to an overstroke condition. At the overstroke condition, the overstroke sensor 70 sends a signal to a controller (illustrated schematically at 72) which provides an overstroke indication to a vehicle operator.

Alternatively or additionally, a lever assembly tab 74 extends from the operating shaft opposite the end segment 22*e*. The lever assembly tab 74 likewise contacts an overstroke sensor 76 which sends a signal to the controller 72 when the operating shaft assembly 22 has been rotated to an overstroke condition. Notably, the sensors are schematically contained within housing portion 12*a* thereby protecting the sensors from road debris and other hostile environmental conditions. It should be understood that other locations can also be utilized with the present invention.

Referring to FIG. 7, another indicator system 76 includes a mechanical overstroke member 78. The mechanical overstroke member 78 is preferably a flexible strip which buckles in response to contact with an end segment 22*e* of the operating shaft assembly 22. Preferably, the mechanical overstroke member 78 is initially, convex relative the interior of the brake housing 12*a*.

The mechanical overstroke member 78 is located in an angular position relative pivot axis P adjacent a path of the operating shaft assembly 22. When the end segment 22*e* of the operating shaft assembly 22 reaches an overstroke condition, the end segment 22*e* contacts the mechanical overstroke member 78 which buckles outward or becomes concave relative the interior of the brake housing 12*a* (FIG. 8). The buckled mechanical overstroke member 78 is therefore readily identifiable from outside the brake housing 12*a* such that an operator or mechanic is readily able to visually identify that an overstroke condition has occurred. Furthermore, once the overstroke condition has been corrected, a mechanic need only press inward on the mechanical overstroke member 78 to return it to the original (FIG. 7) position.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A brake assembly comprising:
   a housing portion comprising a fixed component adapted for attachment to a vehicle structure wherein said housing portion is part of a brake housing that substantially encloses a brake mechanism;
an overstroke sensor mounted to said housing portion; and
an operating shaft that actuates the brake mechanism, said operating shaft rotating about a pivot axis relative to said housing portion, and wherein said operating shaft cooperates with said overstroke sensor to identify an overstroke condition.

2. The brake assembly according to claim 1 wherein said overstroke sensor is directly mounted to said housing portion.

3. The brake assembly according to claim 1 wherein said housing portion comprises a non-rotating brake component.

4. The brake assembly according to claim 1 wherein said operating shaft selectively engages said overstroke sensor.

5. The brake assembly according to claim 1 wherein said overstroke sensor generates a signal that is communicated to a controller.

6. The brake assembly according to claim 5 wherein said overstroke sensor comprises a switch fixed to said housing portion.

7. The brake assembly according to claim 1 wherein said overstroke sensor comprises a visual indicator of an overstroke condition.

8. The brake assembly according to claim 1 including:
an indicator adjustment shaft defining a first axis;
a biasing member that biases said indicator adjustment shaft along said first axis;
a first member fixed to said indicator adjustment shaft; and
a second member mounted to said operating shaft to engage said first member to drive said indicator adjustment shaft along said first axis against said biasing member in response to rotation of said operating shaft about said pivot axis to identify an overstroke condition.

9. The brake assembly according to claim 1 wherein said housing portion comprises a housing wall having an opening extending through an entire thickness of said housing wall, and wherein said overstroke sensor is mounted within said opening such that at least a portion of said overstroke sensor extends outwardly of said housing wall.

10. The brake assembly according to claim 1 wherein said housing portion defines an inner cavity that receives said operating shaft such that said housing portion substantially surrounds and encloses said operating shaft.

11. The brake assembly according to claim 10 wherein the brake mechanism includes at least one piston that transmits force from said operating shaft to a friction pad that is engageable with a rotating brake component.

12. A brake assembly comprising:
a housing portion comprising a fixed component adapted for attachment to a vehicle structure;
an overstroke sensor mounted to said housing portion wherein said overstroke sensor generates a signal that is communicated to a controller, and wherein said overstroke sensor comprises a switch fixed to said housing portion; and
an operating shaft that actuates a brake mechanism, said operating shaft rotating about a pivot axis relative to said housing portion, and wherein said operating shaft cooperates with said overstroke sensor to identify an overstroke condition, and wherein said operating shaft includes a cam portion defining a profile that cooperates with the brake mechanism to move brake pads toward a brake disc, said operating shaft extending from said cam portion to a distal end, and wherein said distal end contacts said switch.

13. A brake assembly comprising:
a housing portion comprising a fixed component adapted for attachment to a vehicle structure;
an overstroke sensor mounted to said housing portion wherein said overstroke sensor generates a signal that is communicated to a controller, and wherein said overstroke sensor comprises a switch fixed to said housing portion; and
an operating shaft that actuates a brake mechanism, said operating shaft rotating about a pivot axis relative to said housing portion, and wherein said operating shaft cooperates with said overstroke sensor to identify an overstroke condition, and wherein said operating shaft includes a cam portion defining a profile that cooperates with the brake mechanism to move brake pads toward a brake disc, said operating shaft including a tab portion extending outward from said operating shaft adjacent said cam portion wherein said tab portion contacts said switch.

14. A brake assembly comprising:
a housing portion comprising a fixed component adapted for attachment to a vehicle structure;
an overstroke sensor mounted to said housing portion wherein said overstroke sensor comprises a visual indicator of an overstroke condition; and
an operating shaft that actuates a brake mechanism, said operating shaft rotating about a pivot axis relative to said housing portion, and wherein said operating shaft cooperates with said overstroke sensor to identify an overstroke condition, and wherein said visual indicator comprises one of a movable post and a resilient buckling member, said one of a movable post and a resilient buckling member being movable relative to said housing portion in response to contact from said operating shaft to indicate an overstroke condition.

15. A method of indicating an overstroke condition of a brake assembly having an operating shaft that actuates a brake mechanism, the method comprising the steps of:
(a) mounting an overstroke sensor to a non-rotating brake housing portion; and
(b) rotating the operating shaft about a pivot axis relative to the non-rotating brake housing portion to selectively contact the overstroke sensor to identify an overstroke condition.

16. The method according to claim 15 wherein step (a) includes directly mounting the overstroke sensor to the non-rotating brake housing portion.

17. The method according to claim 15 wherein the overstroke sensor comprises a visual indicator of an overstroke condition, with the visual indicator including a movable member, and wherein step (b) includes moving the movable member relative to the non-rotating brake housing portion in response to contact from the operating shaft to indicate an overstroke condition.

18. The method according to claim 15 wherein the non-rotating brake housing portion comprises a housing wall having an opening extending through an entire thickness of the housing wall and wherein step (a) includes mounting the overstroke sensor within the opening such that at least a portion of the overstroke sensor extends outwardly of the housing wall.

19. The method according to claim 15 wherein step (b) includes generating a signal from the overstroke sensor to identify an overstroke condition, and communicating the signal to a controller.

20. The method according to claim 15 including substantially surrounding and enclosing the operating shaft within the non-rotating brake housing portion.

* * * * *